United States Patent
Lin et al.

(10) Patent No.: US 12,332,844 B2
(45) Date of Patent: Jun. 17, 2025

(54) FILE PROCESSING METHOD, ELECTRONIC APPARATUS AND STORAGE MEDIUM

(71) Applicant: Samsung Electronics Co., Ltd., Suwon-si (KR)

(72) Inventors: Chao Lin, Xi'An (CN); Wenwen Chen, Xi'An (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/396,345

(22) Filed: Dec. 26, 2023

(65) Prior Publication Data

US 2025/0103556 A1  Mar. 27, 2025

(30) Foreign Application Priority Data

Sep. 26, 2023 (CN) .......................... 202311254194.3

(51) Int. Cl.
*G06F 16/17* (2019.01)
*G06F 16/16* (2019.01)

(52) U.S. Cl.
CPC ........ *G06F 16/1724* (2019.01); *G06F 16/164* (2019.01)

(58) Field of Classification Search
CPC .... G06F 3/0649; G06F 3/0644; G06F 3/0608; G06F 16/1724
USPC ....................................................... 707/693
See application file for complete search history.

(56) References Cited

U.S. PATENT DOCUMENTS

| 8,051,265 | B2 | 11/2011 | Lee et al. |
| 8,909,887 | B1 | 12/2014 | Armangau et al. |
| 10,013,354 | B2 * | 7/2018 | Flynn .................. G06F 12/0246 |
| 10,078,453 | B1 * | 9/2018 | Li ....................... G06F 16/1847 |
| 10,235,079 | B2 | 3/2019 | Hashimoto |
| 10,712,943 | B2 | 7/2020 | Harp |
| 11,232,070 | B2 | 1/2022 | Struyve et al. |
| 11,429,286 | B2 | 8/2022 | Furuta et al. |
| 2022/0283934 | A1 | 9/2022 | Zilberstein et al. |
| 2022/0283968 | A1 * | 9/2022 | Kim .................... G06F 13/1689 |

OTHER PUBLICATIONS

Yang, L. et al., "Improving F2FS Performance in Mobile Devices With Adaptive Reserved Space Based on Traceback" Journal of Latex Class Files, vol. 14, No. 8, Aug. 2015, https://ieeexplore.ieee.org/document/9336045.

* cited by examiner

*Primary Examiner* — Hung T Vy

(74) *Attorney, Agent, or Firm* — Harness, Dickey & Pierce, P.L.C.

(57) ABSTRACT

The present disclosure is related to a file processing method, electronic apparatus and storage medium, the file processing method including: updating a file list according to file access information for a file in a storage device, wherein the file list contains file inode numbers of files to be defragmented; defragmenting the files to be defragmented corresponding to the file inode numbers in the storage device, according to the updated file list, in response to the occurrence of a triggering event.

18 Claims, 10 Drawing Sheets

FILE PROCESSING METHOD, ELECTRONIC APPARATUS AND STORAGE MEDIUM

CROSS-REFERENCE TO RELATED APPLICATION

This application is based on and claims priority under 35 U.S.C. § 119 to Chinese Patent Application No. 202311254194.3, filed on Sep. 26, 2023, the disclosure of which is incorporated by reference herein in its entirety.

TECHNICAL FIELD

The present application relates to a field of file processing, and in particularly, the present application relates to a file processing method, an electronic apparatus and a storage medium.

BACKGROUND ART

With the development of an electronic apparatus, there is a technical demand for defragmentation of files in a storage device to improve a usage performance of the storage device, and especially with the popularity of a mobile terminal such as a smartphone, a tablet computer and so on, a demand for people to use the mobile terminal for file reading and writing is rapidly increasing, however, in the related art, an efficiency of storage space organization, file defragmentation and/or other technologies is lower for a mobile storage device of the mobile terminal.

How to more efficiently perform the storage space organization, file defragmentation and so on in the mobile storage device to better meet the user demand is a technical problem that those skilled in the art have been studying.

SUMMARY

In order to solve at least the above-mentioned problems in the related art, the present inventive concepts provide a file processing method, an electronic apparatus and a storage medium.

According to a first aspect of an example embodiment of the present application, a file processing method is provided, which includes: updating a file list according to file access information for a file in a storage device, wherein the file list contains file inode numbers of files to be defragmented; defragmenting the files to be defragmented corresponding to the file inode numbers in the storage device, according to the updated file list, in response to the occurrence of a triggering event.

Alternatively, the updating the file list according to the file access information for the file in the storage device includes: determining file information of the file according to the file access information for the file, the file information including a file inode number of the file; updating the file list according to the file information.

Alternatively, the file information further includes a file type of the file, which is a reading type or a writing type, wherein the file list is not updated if the file type of the file is the writing type.

Alternatively, the updating the file list according to the file information includes: determining whether the file inode number of the file exists in the file list; adding the file inode number of the file into the file list, if the file inode number of the file does not exist in the file list.

Alternatively, the updating the file list according to the file information further includes: counting an access count and a fragment count of the file according to the file information; determining a weighted fragment count of the file according to the access count and the fragment count of the file; sorting the respective file inode numbers in the file list according to the weighted fragment count of the file.

Alternatively, a file inode number, a fragment count, an access count, and a weighted fragment count of each file to be defragmented form one file information node and the one file information node is included in the file list, and all file information nodes in the file list are stored and looked up in a structure of a radix tree.

Alternatively, the triggering event is one of the following events: a terminal to which the storage device belongs being in a standby state, the terminal being in a state of being charging and not being operated, and a user triggering a defragmentation operation.

Alternatively, the storage device is a Universal Flash Storage (UFS) with a Host Initiated Defrag (HID) 2.0 feature.

Alternatively, the defragmenting the files to be defragmented corresponding to the file inode numbers in the storage device, according to the updated file list, includes: transmitting HID requests and HID target addresses of the files to be defragmented corresponding to the file inode numbers, to the storage device for defragmentation, in an order of the file inode numbers in the updated file list, in response to the occurrence of the triggering event.

According to a second aspect of an example embodiment of the present application, a file processing device is provided, which includes: a processing unit configured to update a file list according to file access information for a file in a storage device, wherein the file list contains file inode numbers of files to be defragmented; and a defragmentation trigger unit configured to defragment the files to be defragmented corresponding to the file inode numbers in the storage device, according to the updated file list, in response to the occurrence of a triggering event.

Alternatively, the processing unit includes: an information collection unit configured to determine file information of the file according to the file access information for the file, the file information including a file inode number of the file; a sorting unit configured to update the file list according to the file information.

Alternatively, the file information further includes a file type of the file, which is a reading type or a writing type, wherein the file list is not updated if the file type of the file is the writing type.

Alternatively, the sorting unit is configured to update the file list according to the file information, by: determining whether the file inode number of the file exists in the file list; adding the file inode number of the file into the file list, if the file inode number of the file does not exist in the file list.

Alternatively, the processing unit further includes an information analysis unit configured to: count an access count and a fragment count of the file according to the file information; and determine a weighted fragment count of the file according to the access count and the fragment count of the file, wherein, the sorting unit is configured to sort the respective file inode numbers in the file list according to the weighted fragment count of the file.

Alternatively, a file inode number, a fragment count, an access count, and a weighted fragment count of each file to be defragmented form one file information node and the one file information node is included in the file list, and all file information nodes in the file list are stored and looked up in a structure of a radix tree.

Alternatively, the triggering event is one of the following events: a terminal to which the storage device belongs being in a standby state, the terminal being in a state of being charging and not being operated, and a user triggering a defragmentation operation.

Alternatively, the storage device is a Universal Flash Storage (UFS) with a Host Initiated Defrag (HID) 2.0 feature.

Alternatively, the defragmentation trigger unit is configured to: transmit HID requests and HID target addresses of the files to be defragmented corresponding to the file inode numbers, to the storage device for defragmentation, in an order of the file inode numbers in the updated file list, in response to the occurrence of the triggering event.

According to a third aspect of an example embodiment of the present application, an electronic apparatus is provided, which includes: at least one processor; and at least one memory storing computer executable instructions, wherein, the computer executable instructions, when being executed by the at least one processor, cause the at least one processor to perform the file processing method as described above.

According to a fourth aspect of an example embodiment of the present application, a computer-readable storage medium storing instructions is provided, wherein the instructions, when being executed by at least one processor, cause the at least one processor to perform the file processing method as described above.

The technical solutions provided by example embodiments of the present disclosure bring at least the following beneficial effects.

The present application does not need to reserve a space for a file, thus avoiding the waste of a storage space. In addition, the present application, after discriminating a file to be defragmented, does not immediately perform defragmentation, but firstly adds a file inode number of the file into a file list, and then defragments files recorded in the file list only when a predetermined or alternatively, desired triggering event occurs (e.g., when a terminal is in an idle state, or when a user inputs a defragmentation command, etc.), thus avoiding affecting the user experience of the terminal.

In addition, the present application determines a weighted fragment count of a file through a fragment count and an access count of this file obtained using statistics, and sorts the file list using the weighted fragment count to discriminate frequently-used files or critical files, to achieve the purpose of de fragmentation of specific files and improve the speed of subsequent access to files.

In addition, the present application can reduce a traffic between a storage device and a host by using a UFS with a HID 2.0 feature, thereby reducing or preventing a problem of a reduced lifetime of the storage device and the host due to the file defragmentation.

It should be understood that the general description above and the detailed description in the following are only illustrative and explanatory, and do not limit the present disclosure.

BRIEF DESCRIPTION OF THE DRAWINGS

The accompanying drawings here are incorporated into the specification and form a part of the present specification, show example embodiments that comply with the present disclosure and are used together with the specification to explain principles of the present disclosure, and do not constitute an improper limitation of the present disclosure.

DETAILED DESCRIPTION OF EXAMPLE EMBODIMENTS

Figure 1:
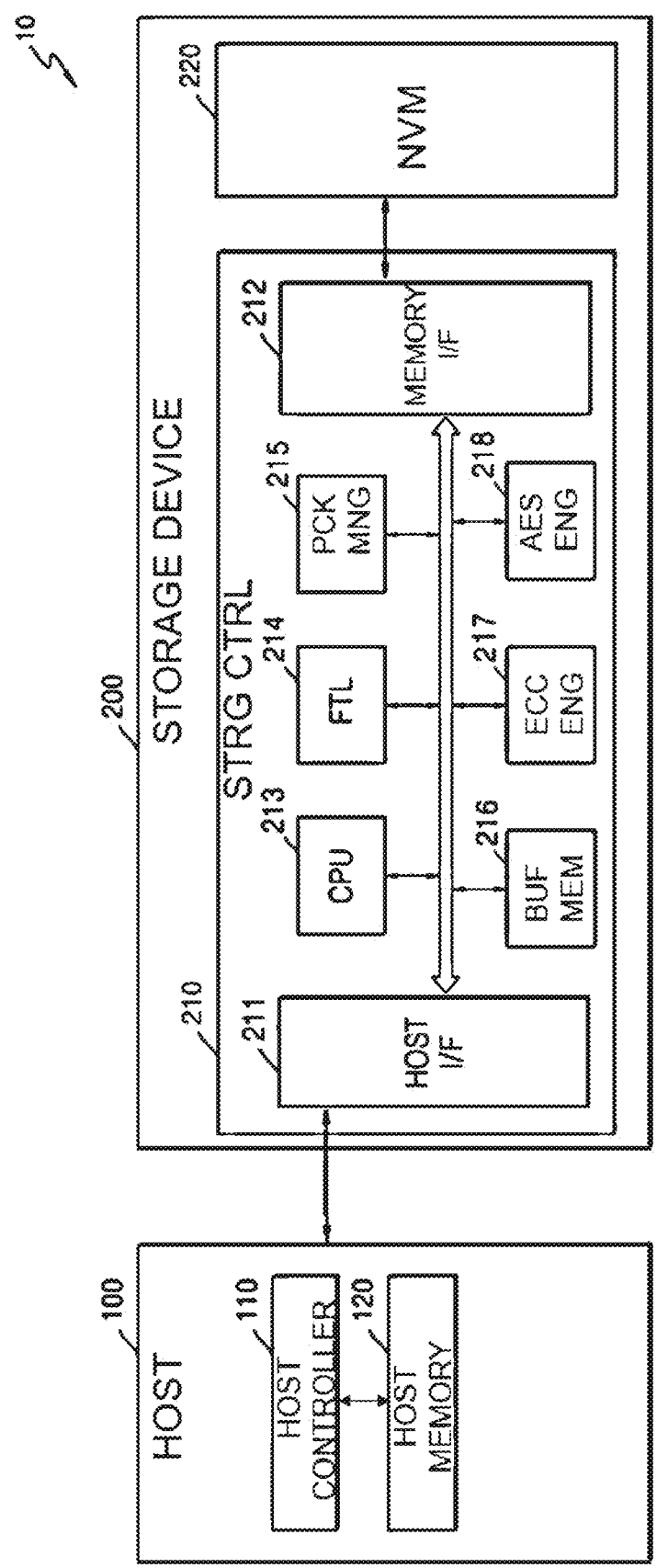
FIG. 1 is a block diagram illustrating a host storage system 10 according to example embodiments of the present application.

In order to enable those ordinary skilled in the art to better understand the technical solution of the present disclosure, technical solutions in example embodiments of the present disclosure will be described clearly and completely in combination with the accompanying drawings.

It should be noted that terms "first", "second", etc. in the specification and claims as well as the above accompanying drawings of the present disclosure are used to distinguish similar objects and need not be used to describe a specific order or sequence. It should be understood that such used data may be interchanged, when appropriate, so that the example embodiments of the present disclosure described herein can be implemented in an order other than those illustrated or described herein. The example embodiments described in the following example embodiments do not represent all example embodiments that are consistent with the present disclosure. On the contrary, they are merely examples of devices and methods that are consistent with some aspects of the present disclosure, as detailed in the appended claims.

It should be noted here that "at least one of several items" appearing in the present disclosure all means that there are three kinds of juxtaposition situations: "any one of these items", "combination of any number of these items", and "all of these items". For example, "including at least one of A and B" includes the following three juxtaposition situations: (1) including A; (2) including B; (3) including A and B. As another example, "performing at least one of operations 1 and 2", that is, means the following three juxtaposition situations: (1) performing operation 1; (2) performing operation 2; (3) performing operations 1 and 2.

To improve the performance of a storage device, the related art proposes various techniques of storage space organization or file defragmentation. For example, a flash-friendly file system (FSFS) has a defragmentation tool defrag.f2fs, which may be used to organize scattered write data and file system metadata on a disk, in order to provide more contiguous storage spaces to increase a writing speed, and this tool provides a user with an interface to specify which blocks to be moved. However, for defrag.f2fs, the user needs to know which blocks to be defragmented, so defrag.f2fs is not user-friendly for use.

In addition, those skilled in the art propose an Adaptive Reserved Space Based on Traceback (ARST) technique. The ARST technique is a file fragmentation prevention solution based on the F2FS. The ARST firstly performs machine learning to identify files those which will be repeatedly updated or appended after being created, e.g., growth files. When a new file is created, the ARST determines whether this file is a growth file based on a model obtained from previous learning, and if so, a certain range of contiguous space is pre-allocated for this file, and when a size of this file grows later, new data will be appended to the pre-allocated contiguous space and logical addresses thereof will not be mixed with data blocks of other files, thus reducing or preventing increasing fragmentation degree of the file. However, the ARST technique reserves or pre-allocates the space by predicting the newly created file according to the trained model, there may be wastage of pre-allocated space for some files since there are some errors in the model.

In addition, those skilled in the art proposes a Cooperative Physical Defragmentation by a File System And a Storage Device (DFSD). The DFSD requires the assistance of the file system and the storage device for complete defragmentation. The DFSD selects a file that has undergone defragmentation of the file system, for defragmentation. For example, the host obtains the required physical fragment information of the file from the storage device through a command provided by a UFS device, and then reads each fragment of this file from the storage device according to the physical fragment information, and then, re-writes the each read fragment of this file into the storage device for defragmentation. However, the DFSD technology requires reading files from the storage device and re-writing the same to the storage device, so the DFSD technology increases the amount of data transmission between the host and the storage device, thereby reducing the lifetime of each device.

In summary, various related techniques for defragmentation of a storage device have problems such as inconvenience in use, waste of storage space, or increased amount of data transmission between the host and the storage device, and so on. In this regard, we propose a file organizing method for defragmentation of a storage device, which is described below with reference to the attached drawings.

FIG. 1 is a block diagram of a host storage system 10 according to example embodiments.

The host storage system 10 may include a host 100 and a storage device 200. Further, the storage device 200 may include a storage controller 210 and an NVM 220. According to example embodiments, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to example embodiments, the host controller 110 and the host memory 120 may be implemented as separate semiconductor chips. Alternatively, in some example embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory (not shown) in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for reducing or preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. For example, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

Figure 2:
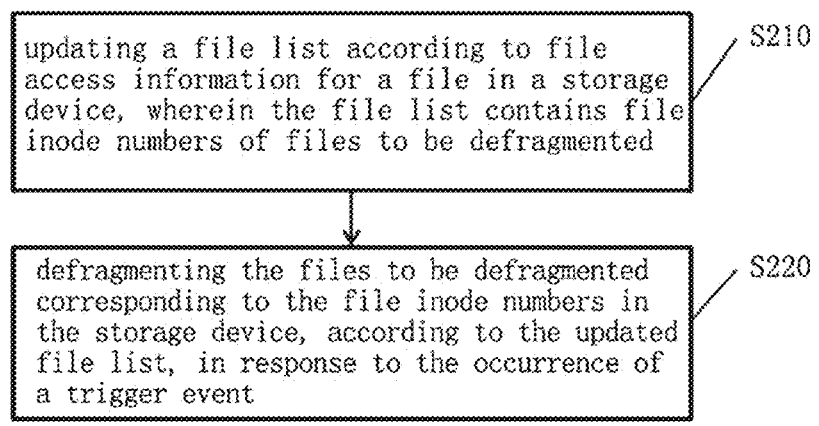
FIG. 2 is a flowchart illustrating a file processing method according to example embodiments of the present application.
Figure 3A:
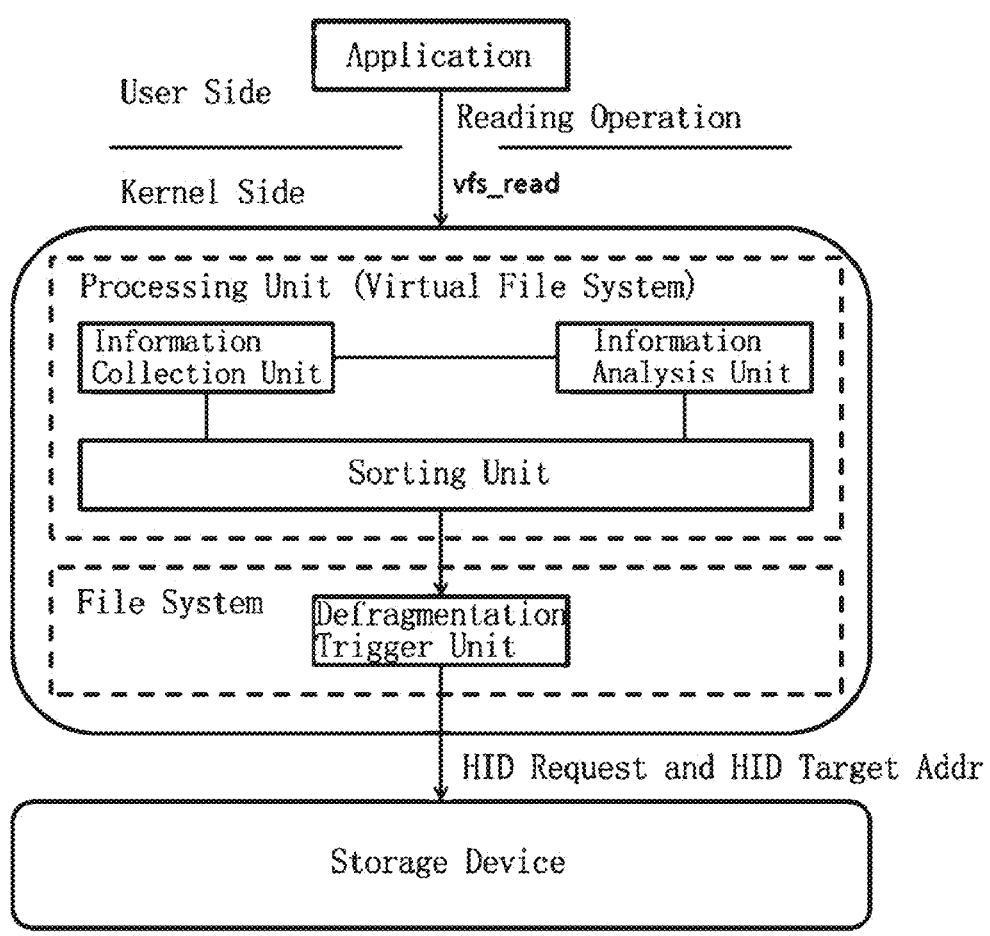
FIG. 3A is a schematic diagram illustrating a process of file processing according to example embodiments of the present application.

FIG. 2 is a flowchart illustrating a file processing method according to example embodiments. FIG. 3A is a schematic diagram illustrating a process of file processing according to example embodiments.

At operation S210, a file list is updated according to file access information for a file in a storage device, wherein the file list contains file inode numbers of files to be defragmented.

For example, in the present application, the file inode numbers of the files to be defragmented are stored using the file list, and the file inode number is used to identify each file to be defragmented. The file access information is access information generated for a certain file in the storage device when an application of an electronic apparatus (e.g., a terminal) needs to access this file. For example, as shown in FIG. 3A, when at an electronic apparatus initiates, in an application at an user side, a reading operation for a certain file in a storage device at the kernel side, this application may generate file access information (e.g., vfs_read) for this file, at this time, a processing unit (e.g., a Virtual File System (VFS)) may update a file list based on this file access information.

The updating the file list according to the file access information for the file in the storage device includes: determining file information of the file according to the file access information for the file, the file information comprising a file inode number of the file; updating the file list according to the file information.

For example, as shown in FIG. 3A, when the application generates the file access information (e.g., vfs_read) for the file in the storage device, an information collection unit in the processing unit may monitor this file access information and extract file information for the file based on this file access information, wherein the file information may include a file inode number (e.g., a inode number) of the file, and thereafter, a sorting unit in the processing unit may update the file list based on this file information. Also, an inode number may be an index that represents or identifies a physical address corresponding to a virtual address.

Here, the file information may also include a file type of the file, which is a reading type or a writing type. Since fragmentation has much less effect on a file of writing type than a file of reading type, the sorting unit may not update the file list if the file type of the file is the writing type. However, the present application may also update the file list for all types of files instead of acquiring the file type of the file.

After acquiring the file information, the updating the file list according to the file information may include: determining whether the file inode number of the file exists in the file list; and adding the file inode number of the file into the file list, if the file inode number of the file does not exist in the file list.

For example, after acquiring the file information of a certain file, the sorting unit may determine whether a file inode number of the file exists in a file list. It indicates that an access to the file by the above previous application may be the first time that the file is accessed if the file inode number of the file does not exist in the file list, and at this time, the file inode number of the file may be added into the file list. It indicates that the file has been previously accessed by the above application or other applications if the file inode number of the file exists in the file list, and there is no need to add the file inode number of the file repeatedly into the file list.

At operation S220, the files to be defragmented corresponding to the file inode numbers in the storage device are defragmented, according to the updated file list, in response to the occurrence of a triggering event.

For example, in the present application, in order to avoid affecting the experience of user with the mobile terminal, after the file list is updated, that is, the files to be defragmented are identified, these files are not immediately defragmented, but these files in the storage device may be defragmented at an appropriate time (e.g., when a system is in an idle state). For example, here, the triggering event may be one of the following events: a terminal to which the storage device belongs being in a standby state, the terminal being in a state of being charging and not being operated, and a user triggering a defragmentation operation. That is, once any of the above triggering events occurs, the files in the storage device corresponding to the file index numbers in the file list may be defragmented based on the updated file list. The present application avoids affecting the experience of using the terminal, by performing defragmentation for the files recorded in the file list only when the predetermined or alternatively, desired triggering event occurs (e.g., when the terminal is in an idle state, or when the user inputs a defragmentation command, etc.).

Further, here, the storage device may be a storage device with a Host Initiated Defrag (HID) feature, for example, it may be a Universal Flash Storage (UFS) with the HID 2.0 feature. In some example embodiments, when a storage device (e.g., UFS) receives a HID request and a HID destination address for a certain file from a host, this storage device uses the received HID request and HID target address for this file to automatically perform defragmentation, according to the HID 2.0 feature. Based on this, the defragmenting the files to be defragmented corresponding to the file inode numbers in the storage device, according to the updated file list, includes: transmitting HID requests and HID target addresses of the files to be defragmented corresponding to the file inode numbers, to the storage device for defragmentation, in an order of the file inode numbers in the updated file list, in response to the occurrence of the triggering event. For example, as shown in FIG. 3A, in response to the occurrence of a triggering event, the defragmentation trigger unit may transmit, to the storage device, a HID request and a HID target address for the file corresponding to each of file inode numbers in the updated file list, in an order of the file inode numbers, so that the storage device performs defragmentation based on the received HID requests and HID target addresses. By using a UFS with a HID 2.0 feature, the present application may reduce the traffic between the storage device and the host, thereby reducing or preventing the problem of reduced lifetime of the storage device and the host due to file defragmentation.

For example, before the files to be defragmented in the storage device corresponding to the file index numbers are defragmented based on the updated file list, the file list may be further updated based on the file information. For example, the updating the file list according to the file information may further comprise: counting an access count and a fragment count of the file according to the file information; determining a weighted fragment count of the file according to the access count and the fragment count of the file; sorting the respective file inode numbers in the file list according to the weighted fragment count of the file.

As shown in FIG. 3A, the information collection unit may transmit the file information of a certain file to an information analysis unit after collecting the file information of this file. The information analysis unit may count a access count of this file based on the received file information of this file, and may collect a fragment count of this file by using a file fragmentation tool, and then transmit, to the sorting unit, the access count and the fragment count of this file as statistics information of this file, together with the file inode number of this file. Thereafter, the sorting unit may calculate the weighted fragment count of this file according to the received statistics information of this file (e.g., the access count and fragment count of this file) using the following equation (1).

$$fw = f \times An \quad (1)$$

Wherein f denotes the fragment count of the file, An denotes the access count of the file, and fw denotes the weighted fragment count.

Figure 3B:
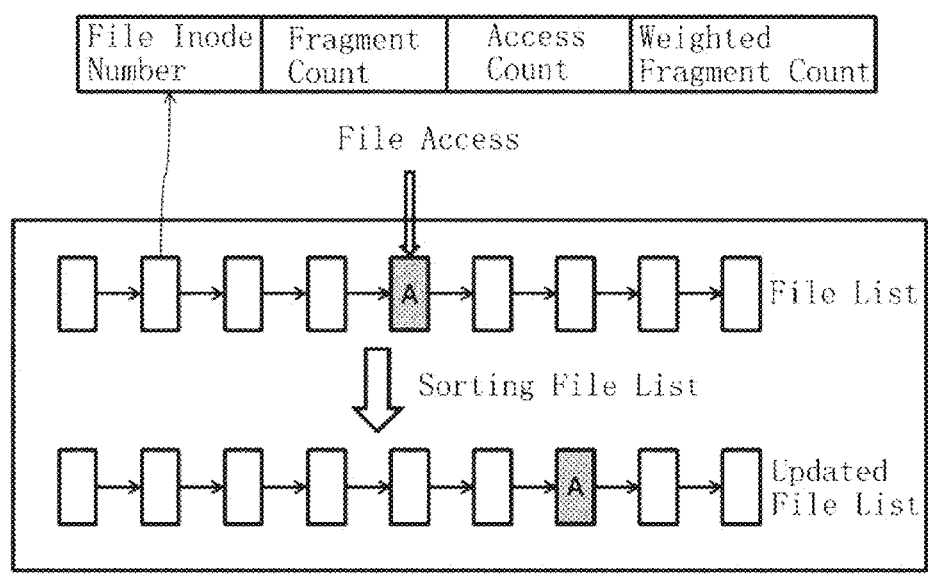
FIG. 3B is a structure schematic diagram illustrating a file list and a file information node according to example embodiments of the present application.
Figure 3C:
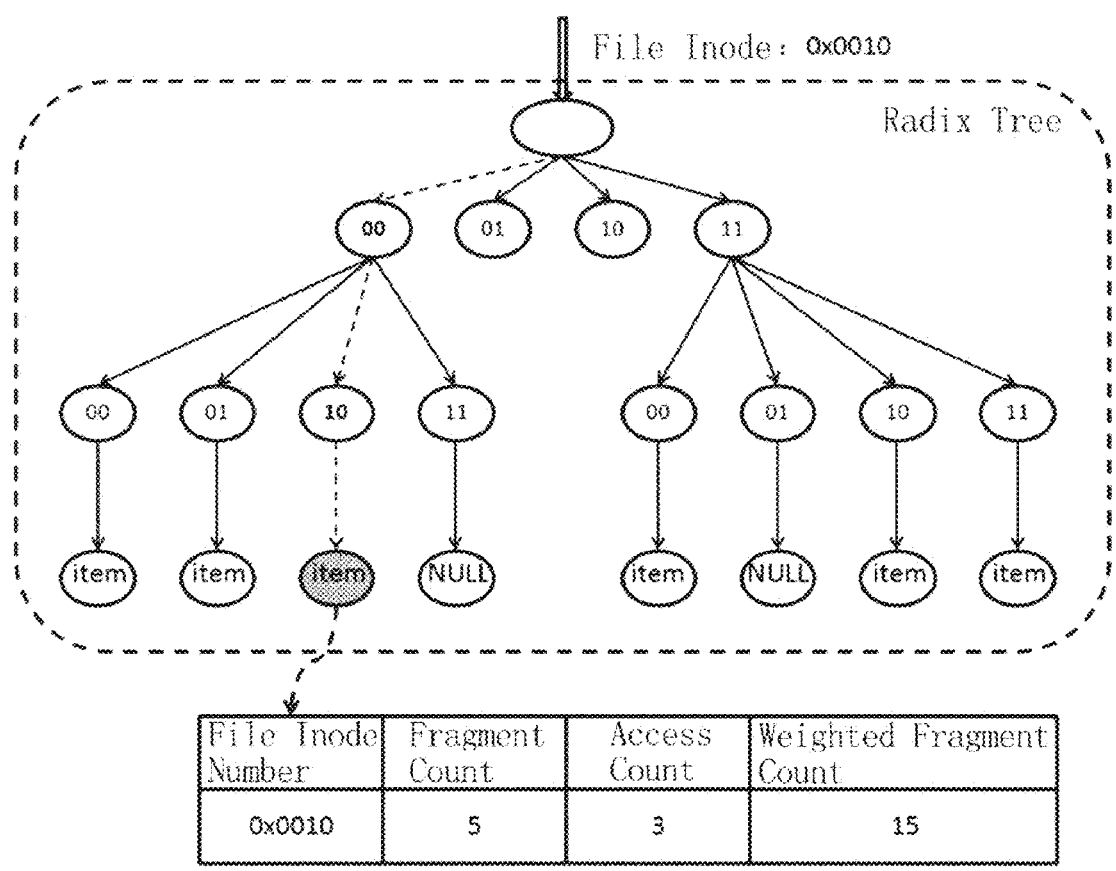
FIG. 3C is a schematic diagram illustrating a process of looking up a file information node using a radix tree according to example embodiments of the present application.

Then, the sorting unit may sort the respective file inode numbers in the file list based on the weighted fragment counts of the files, such as sorting the respective file inode numbers in the file list in a descending order of the weighted fragment counts.

Wherein the file inode number, the fragment count, the access count, and the weighted fragment count of each file to be defragmented form one file information node and the one file information node is included in the file list, and all file information nodes in the file list are stored and looked up in a structure of a radix tree. As shown in FIG. 3B, a file information node includes four bytes, e.g., a file inode number (Inode number), a fragment count (f), an access count (An), and a weighted fragment count (fw), and each file information node in a file list may be quickly looked up according to a radix tree shown in FIG. 3C. For example, as shown in FIG. 3B, when an application accesses a file with file node index number of 0x0010 in a storage device, by the process described above, the information collection unit may determine a file inode number of this file based on file access information for this file. The information analysis unit determines an access count and a fragment count of this file according to the file inode number of this file. The sorting unit may quickly look up file node information of this file from top to bottom layer by layer, by using the radix tree according to the file inode number, and determine the weighted fragment count of this file by using the access count and fragment count of this file determined by the information analysis unit, and update the respective fields in the looked-up file node information of this file, and then use a fast sorting algorithm to sort the file list at this time. However, storing and looking up the file list using the radix tree are only example embodiments, and the present application is not limited to this, and other manners may also be used to store and look up the file list.

After sorting the respective file inode numbers in the file list according to the weighted fragment counts of the files, e.g., after sorting the respective file inode numbers in the file list in a descending order of the weighted fragment counts, the files in the storage device corresponding to the file inode numbers may be defragmented according to a rank of the file inode numbers in the updated file list (in the descending order of the weighted fragment counts) in response to the occurrence of a triggering event. Since the process of defragmenting the files to be defragmented in the storage device in response to the triggering event has been described above, it will not be repeated here. By sorting the file list according to weighted fragment counts of files, and performing defragmentation according to the sorted file list, a priority for processing may be given to a file with a higher fragmentation degree in the storage device, to achieve a purpose of defragmentation of critical files and improve a speed of subsequent access to files.

Figure 4:
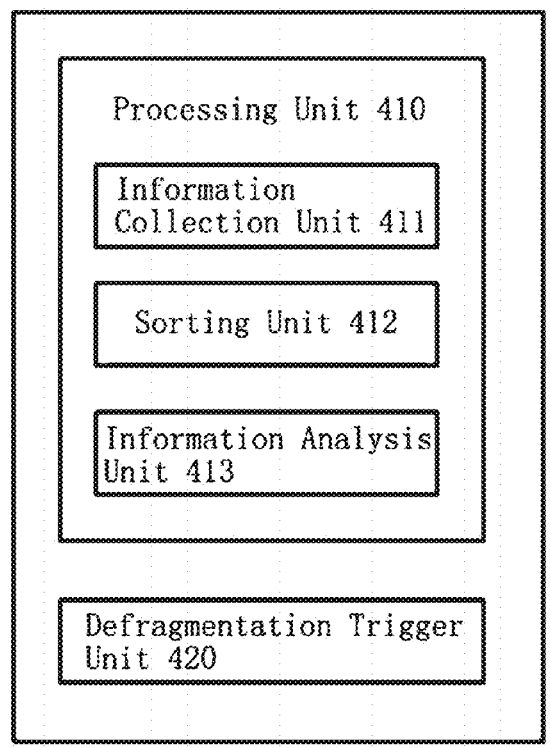
FIG. 4 is a block diagram illustrating a file processing device according to example embodiments of the present application.

FIG. 4 is a block diagram illustrating a file processing device according to an example embodiments of the present application.

As shown in FIG. 4, a file processing device 400 may include a processing unit 410 and a defragmentation trigger unit 420. The processing unit 410 may be configured to: update a file list according to file access information for a file in a storage device, wherein the file list contains file inode numbers of files to be defragmented. The defragmentation trigger unit 420 may be configured to: defragment the files to be defragmented corresponding to the file inode numbers in the storage device, according to the updated file list, in response to the occurrence of a triggering event. For example, the processing unit 410 and the defragmentation trigger unit 420 may be the processing unit and the defragmentation trigger unit as illustrated in FIG. 3A.

For example, as shown in FIG. 4, the processing unit 410 may include an information collection unit 411 and a sorting unit 412. The information collection unit 411 may be configured to: determine file information of the file according to the file access information for the file, the file information comprising a file inode number of the file. The sorting unit 412 may be configured to update the file list according to the file information. For example, the information collection unit 411, the sorting unit 412, the information analysis unit 413 of the processing unit 410 may be the information collection unit, the sorting unit, the information analysis unit as illustrated in FIG. 3A.

In other example embodiments of the present application, the file information of the file determined by the information collection unit 411 may include a file type of the file, in addition to the file inode number of the file, wherein the file type may be a reading type or a writing type. The sorting unit 412 may not update the file list if the file type of the file is a writing type.

The sorting unit 412 may be configured to update the file list according to the file information, by: determining whether the file inode number of the file exists in the file list; adding the file inode number of the file into the file list, if the file inode number of the file does not exist in the file list.

The triggering event may be one of the following events: a terminal to which the storage device belongs being in a standby state, the terminal being in a state of being charging and not being operated, and a user triggering a defragmentation operation. That is, once the above triggering event occurs, the defragmentation trigger unit 420 may defragment the files in the storage device corresponding to the file index numbers in the file list based on the updated file list.

In addition, the storage device described above has a Host Initiated Defrag (HID) feature, for example, may be a Universal Flash Storage (UFS) with the HID 2.0 feature. In some example embodiments, when a storage device (e.g., UFS) receives a HID request and a HID destination address for a certain file from a host (e.g., the file processing device 400 in the host), this storage device uses the received HID request and HID target address for this file to automatically perform defragmentation according to the HID 2.0 feature. Based on this, the defragmentation trigger unit 420 may be configured to: transmit HID requests and HID target addresses of the files to be defragmented corresponding to the file inode numbers, to the storage device for defragmentation, in an order of the file inode numbers in the updated file list, in response to the occurrence of the trigger event. Since these have been described in detail above with reference to FIGS. 2, 3A and 3B, it will not be repeated here.

In addition, the processing unit 410 may further include an information analysis unit 413, wherein the information analysis unit 413 may be configured to: count an access count and a fragment count of the file according to the file information; and determine a weighted fragment count of the file according to the access count and the fragment count of the file. The sorting unit 412 may further be configured to sort the respective file inode numbers in the file list according to the weighted fragment count of the file. In addition, a file inode number, a fragment count, a access count, and a weighted fragment count of each file to be defragmented form one file information node and the one file information node is included in the file list, and all file information nodes in the file list are stored and looked up in a structure of a radix tree. After sorting the file list according to the weighted fragment counts, the defragmentation trigger unit 420 performs defragmentation according to the sorted file list, therefore a priority for processing may be given to a file with a higher fragmentation degree in the storage device, thereby achieving a purpose of defragmentation of critical files. Since these have been described in detail above with reference to FIGS. 2, 3A and 3B, it will not be repeated here.

For a better understanding of the present application, the process of file defragmentation of a storage device using the method of the present application described above is exemplarily described below with reference to FIGS. 4, 5A, 5B, and 6.

Figure 5A:
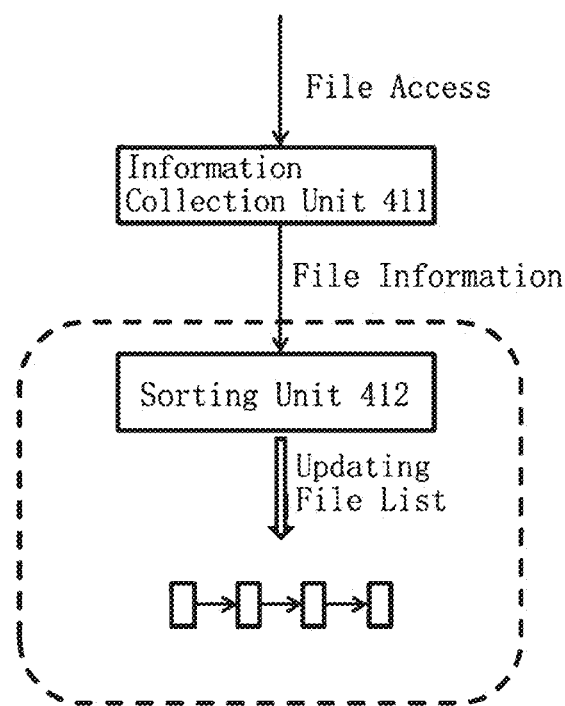
FIG. 5A is a schematic diagram illustrating a process of updating a file list according to example embodiments of the present application.
Figure 5B:
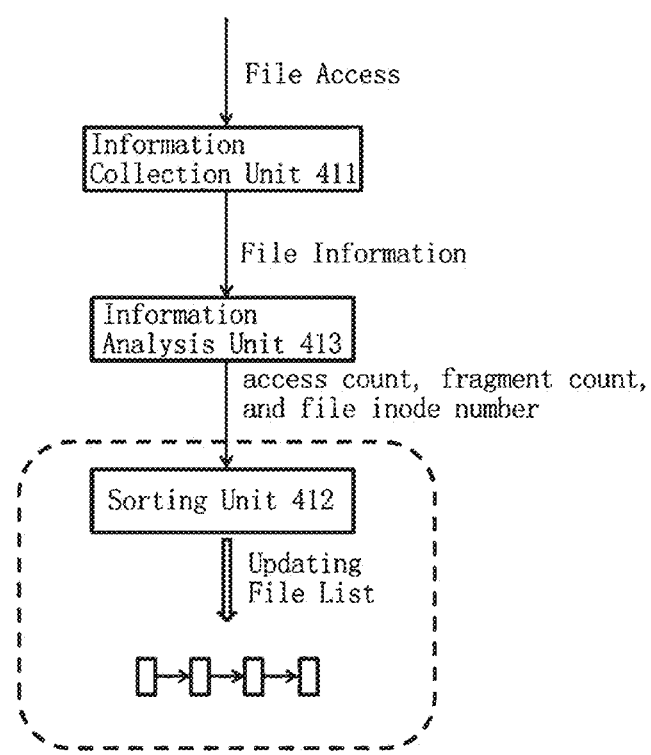
FIG. 5B is a schematic diagram illustrating a process of updating a file list according to other example embodiments of the present application.
Figure 6:
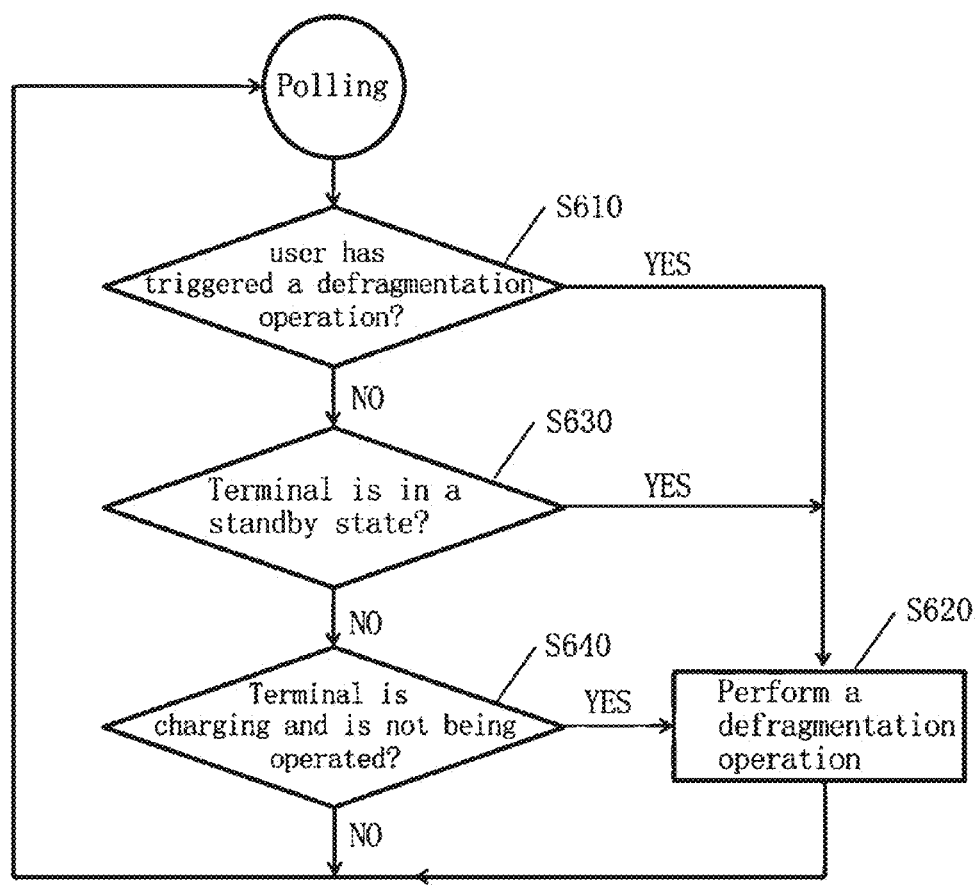
FIG. 6 is a flowchart illustrating a process of detecting a triggering event and performing a defragmentation of a storage device in response to the occurrence of the triggering event according to example embodiments of the present application.

FIG. 5A is a schematic diagram illustrating a process of updating a file list according to example embodiments of the present application. FIG. 5B is a schematic diagram illustrating a process of updating a file list according to other example embodiments of the present application. FIG. 6 is a flowchart illustrating a process of detecting a triggering event and performing a defragmentation of a storage device in response to the occurrence of the triggering event according to example embodiments of the present application.

Firstly, as shown in FIG. 5A, when an application wants to access a file in a storage device, an information collection unit 411 may collect file information of this file. For example, the information collection unit 411 may use a file inode (inode) number monitoring tool (e.g., an inotify-tools in a Linux kernel) to acquire a inode number of this file and, alternatively, to further acquire an I/O type of this file.

Thereafter, after the file information is acquired from the information collection unit 411, the sorting unit 412 may firstly determine a file type according to the file information, and the sorting unit 412 may ignore the file information and not update a file list if the file type is a writing type. However, in the present application, the information collection unit 411 may also not acquire the I/O type of the file, then the sorting unit 412 may ignore the file type and update the file list for all files.

Thus, when the file type is considered and the file type of the file is a reading type, or when the file type is not considered, the sorting unit 412 may determine whether the file inode number of this file exists in the file list, and if not, add the file inode number of this file into the file list. The sorting unit 412 may not update the file list if it exists in the file list.

As shown in FIG. 6, a defragmentation trigger unit 420 may poll (e.g., in a background of a terminal) at a certain period, to determine whether a predetermined or alternatively, desired triggering event occurs, and when the predetermined or alternatively, desired triggering event occurs, perform defragmentation of the storage device according to the updated file list, such as triggering a HID process and a defragmentation process in a file system.

For example, as shown in FIG. 6, firstly, at operation S610, the defragmentation trigger unit 420 may firstly determine whether the user has triggered a defragmentation operation, for example, whether the user has input a defragmentation command. If it is determined that the user has triggered the defragmentation operation, it proceeds to operation S620 to begin a defragmentation operation, e.g., to defragment files to be defragmented in the storage device corresponding to the file inode numbers based on the updated file list. If it is determined that the user has not triggered the defragmentation operation, it proceeds to operation S630.

At operation S630, a defragmentation trigger unit 420 may determine whether the terminal is in a standby state, e.g., whether it is in the standby state at midnight. If the terminal is in the standby state, it proceeds to operation S620 to begin a defragmentation operation, and if the terminal is not in the standby state, it proceeds to operation S640.

At operation S640, the defragmentation trigger unit 420 may determine whether the terminal is charging and is not being operated. If the terminal is charging and not being operated, it proceeds to operation S620 to start the defragmentation operation, otherwise, it ends the current process, and performs the operation from operation S610 again after a predetermined or alternatively, desired time period (e.g., returns to continue polling).

The process shown in FIG. 5A above is only an example, and furthermore, the process shown in FIG. 5B is an improved example of FIG. 5A.

After the process of FIG. 5A is completed, an information analysis unit 413 may count a access count and a fragment count of a file identified by the file inode for the file according to the file information, and determine a weighted fragment count of this file according to the access count and the fragment count of this file. Then, the sorting unit 412 may sort the respective file inode numbers in the file list according to the weighted fragment count of the file, for example, sorting the respective file inode numbers in the file list in a descending order of the weighted fragment counts of files.

The defragmentation trigger unit 420 may perform a polling process (e.g., in a background of a terminal) at a certain period, to determine whether a predetermined or alternatively, desired triggering event occurs, and perform defragmentation of the storage device according to the updated file list when the predetermined or alternatively, desired triggering event, such that a priority for processing may be given to a file with a higher fragmentation degree in the storage device, to achieve a purpose of defragmentation of critical files, e.g., performing the process described above as shown in FIG. 6.

Figure 7:
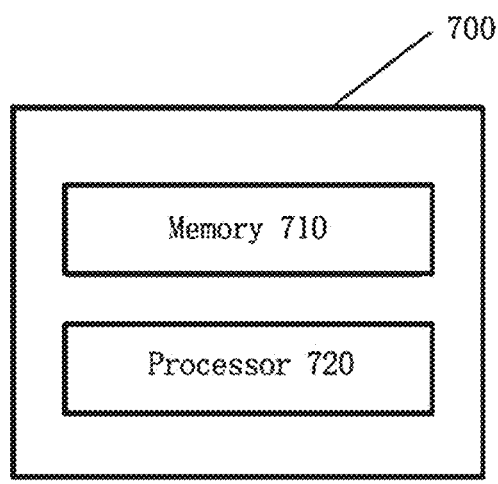
FIG. 7 is a block diagram illustrating a structure of an electronic apparatus according to example embodiments of the present application.

FIG. 7 is a block diagram of an electronic apparatus 700 according to example embodiments of the present disclosure.

Referring to FIG. 7, the electronic apparatus 700 may include at least one memory 710 storing computer executable instructions and at least one processor 720, wherein the computer executable instructions, when being executed by the at least one processor 720, cause the at least one processor 720 to perform the file processing method according to example embodiments of the present disclosure.

The processor may include one or more processors. At this time, the one or more processors may be general-purpose processor such as central processing units (CPUs), application processors (APs), etc., and processors only used for graphics such as graphics processor units (GPUs), visual processor units (VPUs), and/or AI specific processors.

As an example, the electronic apparatus may be a PC computer, a tablet device, a personal digital assistant, a smartphone, or other devices capable of executing the above set of instructions. Herein, the electronic apparatus does not have to be a single electronic apparatus, but may also be an assembly of any device or circuit that is capable to execute the above instructions (or instruction sets) individually or jointly. The electronic apparatus may also be a part of an integrated control system or system manager, or may be configured as a portable electronic apparatus that is interfaced with a local or remote (e.g., via wireless transmission).

In the electronic apparatus, the processor may include a central processing unit (CPU), a graphics processing unit (GPU), a programmable logic device, a specialized processor system, a microcontroller, or a microprocessor. By way of example and not limitation, processors may also include an analog processor, a digital processor, a microprocessor, a multicore processor, a processor array, a network processor, and the like.

The processor may execute the instructions or codes stored in the memory, wherein the memory may also store data. The instructions and data may also be transmitted and received through a network via a network interface device, wherein network interface device may adopt any known transmission protocol.

The memory may be integrated with the processor, for example, by placing a RAM or flash memory within an integrated circuit microprocessor, etc. In addition, the memory may include an independent device, such as, an external disk driver, a storage array, or other storage devices that may be used by any database system. The memory and processor may be coupled operationally, or they may communicate with each other, such as through an I/O port, a network connection, etc., so that the processor is capable of reading a file stored in the memory.

In addition, the electronic apparatus may also include a video display (such as, a LCD display) and a user interaction interface (such as, a keyboard, mouse, touch input device, etc.). All components of the electronic apparatus may be connected to each other through a bus and/or network.

According to example embodiments of the present disclosure, a computer-readable storage medium storing instructions is also provided, wherein the instructions, when being executed by at least one processor, cause the at least one processor to perform the file processing method according to example embodiments of the present disclosure. Examples of the computer-readable storage medium here includes: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state hard disk (SSD), card memory (such as a multimedia card, secure digital (SD) card, or extreme digital (XD) card), magnetic tape, floppy disk, magneto-optical data storage device, optical data storage device, hard disk, solid state disk, and any other devices configured to store the computer programs and any associated data, data files and data structures in a non-transitory manner, and provide the computer programs and any associated data, data files and data structures to a processor or computer so that the processor or computer can execute the computer programs. The instructions or computer programs in the above-mentioned computer readable-storage medium can be executed in an environment deployed in a computer apparatus such as a client, a host, a proxy device, a server, etc. in addition, in one example, the computer programs and any associated data, data files and data structures are distributed over networked computer systems so that the computer programs and any associated data, data files and data structures are stored, accessed and executed in a distributed manner by one or more processors or computers.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

After considering the description and practicing the present inventive concepts disclosed herein, those skilled in the art are easily think of other example embodiments of the present disclosure. The present application intends to cover any variation, use or adaptation of the present disclosure, which follow general principles of the present disclosure and include the common general knowledge or frequently used technical means in the technical field, which are not disclosed in the present disclosure. The description and example embodiments are only regarded as examples, and the true scope and spirit of the present disclosure are defined by the claims.

What is claimed is:

1. A file processing method, comprising:
updating a file list according to file access information for a file in a storage device, wherein the file list contains file inode numbers of files to be defragmented; and
defragmenting the files to be defragmented corresponding to the file inode numbers in the storage device, according to the updated file list, in response to occurrence of a triggering event,
wherein the updating the file list according to the file access information for the file in the storage device comprises
determining file information of the file according to the file access information for the file, the file information comprising a file inode number of the file, and updating the file list according to the file information, and
wherein the file information further comprises a file type of the file being a reading type or a writing type, and the file list is not updated if the file type of the file is the writing type.

2. The file processing method according to claim 1, wherein the updating the file list according to the file information comprises:
determining whether the file inode number of the file exists in the file list; and
adding the file inode number of the file into the file list, if the file inode number of the file does not exist in the file list.

3. The file processing method according to claim 2, wherein the updating the file list according to the file information further comprises:
counting an access count and a fragment count of the file according to the file information;
determining a weighted fragment count of the file according to the access count and the fragment count of the file; and
sorting the file inode numbers in the file list according to the weighted fragment count of the file.

4. The file processing method according to claim 3, wherein, a file inode number, a fragment count, an access count, and a weighted fragment count of each file to be defragmented form one file information node and the one file information node is included in the file list, and all file information nodes in the file list are stored and looked up in a structure of a radix tree.

5. The file processing method according to claim 1, wherein the triggering event is one of a terminal to which the storage device belongs being in a standby state, the terminal being in a state of charging and not being operated, and a user triggering a defragmentation operation.

6. The file processing method according to claim 1, wherein the storage device is a Universal Flash Storage (UFS) with a Host Initiated Defrag (HID) 2.0 feature.

7. The file processing method according to claim 6, wherein the defragmenting the files to be defragmented corresponding to the file inode numbers in the storage device, according to the updated file list, comprises:
transmitting HID requests and HID target addresses of the files to be defragmented corresponding to the file inode numbers, to the storage device for defragmentation, in an order of the file inode numbers in the updated file list, in response to the occurrence of the triggering event.

8. An electronic apparatus, comprising:
at least one processor; and
at least one memory storing computer executable instructions,
wherein, the computer executable instructions, when being executed by the at least one processor, cause the at least one processor to perform the file processing method according to claim 1.

9. A computer-readable storage medium storing instructions, wherein the instructions, when being executed by at least one processor, cause the at least one processor to perform the file processing method according to claim 1.

10. A file processing device, comprising:
a processor configured to update a file list according to file access information for a file in a storage device, wherein the file list contains file inode numbers of files to be defragmented; and
a defragmenter configured to defragment the files to be defragmented corresponding to the file inode numbers in the storage device, according to the updated file list, in response to occurrence of a triggering event,
wherein the triggering event is one of a terminal to which the storage device belongs being in a standby state, and the terminal being in a state of charging and not being operated.

11. The file processing device according to claim 10, wherein the processor comprises:
an information collection unit configured to determine file information of the file according to the file access information for the file, the file information comprising a file inode number of the file; and
a sorting unit configured to update the file list according to the file information.

12. The file processing device according to claim 11, wherein, the file information further comprises a file type of the file, which is a reading type or a writing type,
wherein the file list is not updated if the file type of the file is the writing type.

13. The file processing device according to claim 11, wherein, the sorting unit is configured to update the file list according to the file information, by:
determining whether the file inode number of the file exists in the file list; and
adding the file inode number of the file into the file list, if the file inode number of the file does not exist in the file list.

14. The file processing device according to claim 13, wherein, the processor further comprises an information analysis unit configured to:
count an access count and a fragment count of the file according to the file information; and
determine a weighted fragment count of the file according to the access count and the fragment count of the file,
wherein, the sorting unit is configured to sort the respective file inode numbers in the file list according to the weighted fragment count of the file.

15. The file processing device according to claim 14, wherein, a file inode number, a fragment count, an access count, and a weighted fragment count of each file to be defragmented form one file information node, and the one file information node is included in the file list, and all file information nodes in the file list are stored and looked up in a structure of a radix tree.

16. The file processing device according to claim 10, wherein the triggering event further comprising one of the terminal being in the standby state, the terminal being in the state of charging and not being operated, and a user triggering a defragmentation operation.

17. The file processing device according to claim 10, wherein the storage device is a Universal Flash Storage (UFS) with a Host Initiated Defrag (HID) 2.0 feature.

18. The file processing device according to claim 17, wherein the defragmenter is configured to transmit HID requests and HID target addresses of the files to be defragmented corresponding to the file inode numbers, to the storage device for defragmentation, in an order of the file inode numbers in the updated file list, in response to the occurrence of the triggering event.

* * * * *